US009081592B2

(12) United States Patent
Raghavan et al.

(10) Patent No.: US 9,081,592 B2
(45) Date of Patent: Jul. 14, 2015

(54) ACTION PERFORMED INDICATORS FOR MENU ITEMS

(71) Applicant: Oracle International Corporation, Redwood Shores, CA (US)

(72) Inventors: Sriram Raghavan, Bangalore (IN); Blake Sullivan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 465 days.

(21) Appl. No.: 13/644,134

(22) Filed: Oct. 3, 2012

(65) Prior Publication Data

US 2014/0096043 A1    Apr. 3, 2014

(51) Int. Cl.
*G06F 3/0481* (2013.01)
*G06F 9/44* (2006.01)

(52) U.S. Cl.
CPC .................. *G06F 9/4443* (2013.01)

(58) Field of Classification Search
CPC ......... G06F 3/00; G06F 3/048; G06F 3/0481; G06F 3/0482; G06F 9/44543; G06F 3/0237
See application file for complete search history.

(56) References Cited

U.S. PATENT DOCUMENTS

| | | | |
|---|---|---|---|
| 7,647,304 B2 | 1/2010 | Burke et al. | |
| 8,219,931 B2 * | 7/2012 | Hsieh et al. | 715/835 |
| 2003/0124974 A1 * | 7/2003 | Asami | 455/3.02 |
| 2006/0015839 A1 | 1/2006 | Owens et al. | |
| 2008/0222188 A1 * | 9/2008 | Watson et al. | 707/102 |
| 2009/0070301 A1 | 3/2009 | McLean et al. | |
| 2009/0125335 A1 * | 5/2009 | Manetta et al. | 705/3 |
| 2009/0216716 A1 | 8/2009 | Venkata et al. | |

OTHER PUBLICATIONS

"THE IreAtlas Townland Database," print date Mar. 28, 2012; 2 pages; http://www.seanruad.com/.
"HST Search Form," print date Mar. 28, 2012; 1 page; http://archive.stsci.edu/hst/search.php.
"Fancy Drop Down Menus with Pure!" print date Mar. 28, 2012; 7 pages; http://css3menu.com/.
"Style Your Form Fields with Icons to Improve Usability" print date Mar. 28, 2012; 7 pages; http://www.addicottweb.com/2009/03/style-form-input-fields-with-icons-to-improve-usability/.
"Edit an AJAX Drop-Down Menu in Dreamweaver" print date Mar. 28, 2012; 25 pages; http://layersmagazine.com/edit-an-ajax-drop-down-menu-in-dreamweaver.html.
"UI Elements: Search Box with Filter and Large Drop Down Menu" print date Mar. 28, 2012; 12 pages; http://tympanus.net/codrops/2010/07/14/ui-elements-search-box/.

* cited by examiner

*Primary Examiner* — Xiomar L Bautista
(74) *Attorney, Agent, or Firm* — Kilpatrick Townsend & Stockton LLP

(57) ABSTRACT

In various embodiments, one or more visual elements are introduced with menu item that indicate that action on this item has already been performed at least once. In various aspects, a distinctive icon can be placed with a menu item to indicate that a search field has been previously added to a search form, that a column has been added to a report, or that existing data or queries under construction have been modified by the action on an indicated item.

20 Claims, 5 Drawing Sheets

ACTION PERFORMED INDICATORS FOR MENU ITEMS

BACKGROUND OF THE INVENTION

In general, software applications make use of menus, toolbars, dialogs, and other user interface elements to convey information and provide application functionality. A menu can display a list of options (menu items) for users to choose or browse through. Typically, menus are logically grouped and displayed by an application so that a user need not memorize all available commands or actions that may be invoked. Menus usually are primary means that users access an application's features as well as provide a quick way for users to see what those features are.

In certain use cases, the commands or actions associated with menu items can be invoked repeatedly. For example, in an application where a user is designing a user interface, such as a search form, an "Add Fields" menu may include one or more menu items for search fields that can be added to the search form. A user can click on any of the menu items to add a search field on to the search form. In many use cases, there can be around 10-15 search fields on the search form. This also means that there can be at least that many menu items in the "Add Fields" menu. End users oftentimes are unable to know which search fields are already added to the search form and which ones have not by navigating the menu.

Accordingly, what is desired is to solve problems relating to user interfaces for communicating to users that one or more repeatable actions have been invoked at least once, some of which may be discussed herein. Additionally, what is desired is to reduce drawbacks relating to user interfaces for communicating to users that one or more repeatable actions have been invoked at least once, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, one or more visual elements are introduced with menu item that indicate that action on this item has already been performed at least once. In various aspects, a distinctive icon can be placed with a menu item to indicate that a search field has been previously added to a search form, that a column has been added to a report, or that existing data or queries under construction have been modified by the action on an indicated item.

In one embodiment, a method for communicating to users of applications that repeatable actions have been performed at least once includes receiving information indicative of a user of an application causing a first action to be performed in response to the user selecting a visual representation of the first action from one or more visual representations of a plurality of actions that may be repeatable performed by the user of the application. Information is received indicative of a determination that the first action has been performed. The visual representation of the first action is then modified to indicate that the first action has been performed at least once.

In further embodiments, modifying the visual representation of the first action to indicate that the first action has been performed at least once can include adding one or more visual elements to the visual representation of the first action. Modifying the visual representation of the first action to indicate that the first action has been performed at least once may further include updating a color or highlighting of the visual representation of the first action.

In one aspect, information configured to perform the first action may be generated and/or the first action otherwise performed. Generating the information configured to perform the first action may include generating information configured to add one or more search fields associated with the first action to a search user interface. Generating the information configured to perform the first action may include generating information configured to add one or more columns associated with the first action to a table. Generating the information configured to perform the first action may include generating information configured to add one or more fields associated with the first action to a report. In yet another aspect, generating the information configured to perform the first action comprises may include information configured to add one or more panels or portlets associated with the first action to a portal. Generating the information configured to perform the first action may include generating information configured to modify one or more statements associated with the first action of a Structured Query Language (SQL) query.

In a further embodiment, a non-transitory computer-readable medium stores computer-executable code for communicating to users of applications that repeatable actions have been performed at least once. The non-transitory computer-readable medium can include code for receiving information indicative of a user of an application causing a first action to be performed in response to the user selecting a visual representation of the first action from one or more visual representations of a plurality of actions that may be repeatable performed by the user of the application, code for receiving information indicative of a determination that the first action has been performed, and code for modifying the visual representation of the first action to indicate that the first action has been performed at least once.

In some embodiments, a non-transitory computer-readable media stores computer-executable code for indicating presence of search fields displayed in menu of an application configured to generate search pages on a user-configurable search page designed by the application. The non-transitory computer readable medium can include code for generating a menu having a plurality of search fields that may be added to a search page designed by the application, code for receiving information indicative of an action to add at least one search field selected from the menu to the search page, code for generating information configured to perform the action to add the at least one search field to the search page, and code for updating the menu to include at least a visual indicator that the at least one search field has been added to the search page. The code for updating the menu to include at least a visual indicator that the at least one search field has been added to the search page may include code for adding one or more icons next to the at least one search field.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

In various embodiments, one or more visual elements are introduced with menu item that indicate that action on this item has already been performed at least once. In various aspects, a distinctive icon can be placed with a menu item to indicate that a search field has been previously added to a search form, that a column has been added to a report, or that existing data or queries under construction have been modified by the action on an indicated item.

Figure 1:
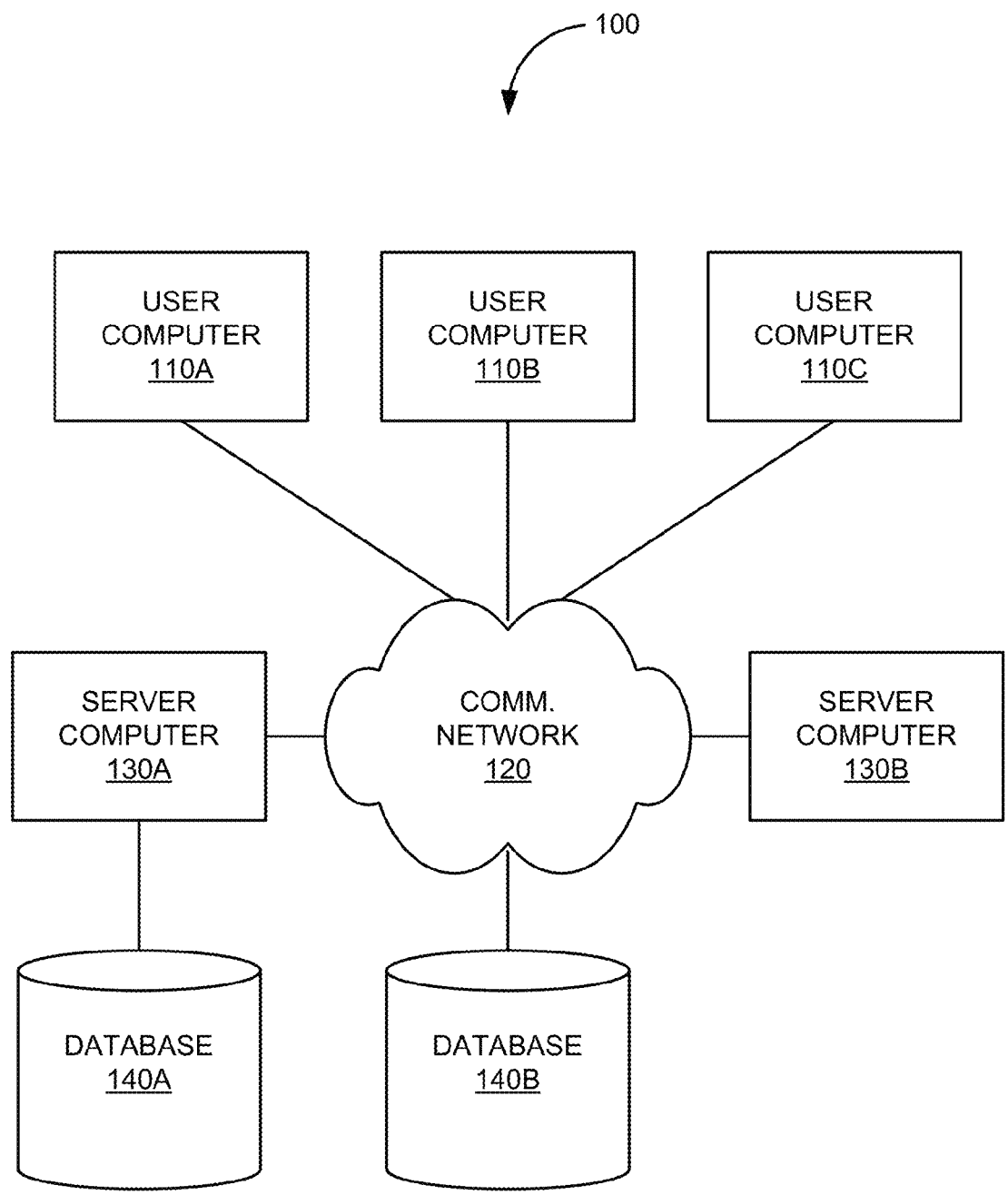
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general-purpose personal computers (including, merely by way of example, personal computers and/or laptop computers running any appropriate flavor of Microsoft Corp.'s WindowsTM and/or Apple Corp.'s MacintoshTM operating systems) and/or workstation computers running any of a variety of commercially-available UNIXTM or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the BluetoothTM protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially available server operating systems. Each of server computers 130 may also be running one or more applications, each of which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one or more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, JavaScript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Figure 2:
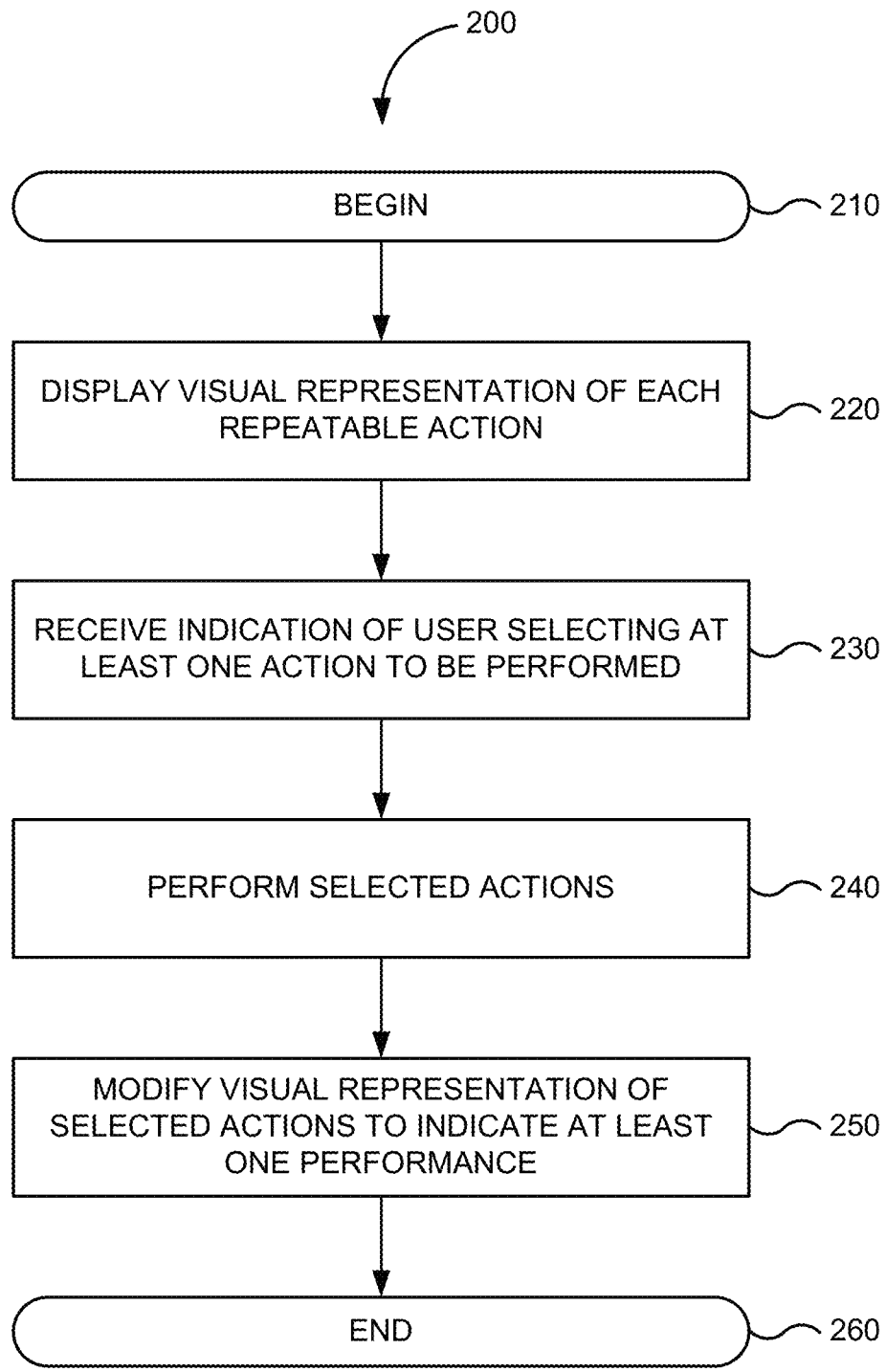
FIG. 2 is a flowchart of a method for communicating to users that one or more repeatable actions have been invoked at least once in one embodiment.

FIG. 2 is a flowchart of method 200 for communicating to users that one or more repeatable actions have been invoked at least once in one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a visual representation is displayed of each repeatable action. A visual representation can include graphical information, such as text, icons, lines, images, figures, video and other multimedia information, or the like. Each repeatable action may be represented by one or more distinguishing features that include variations on form, shape, size, color, transparency, and the like. Some common examples of a visual representation are user interface elements or widgets, such as menu items, toolbar buttons, ribbon interfaces, or the like.

In step 230, an indicative is received of user selecting at least one action to be performed. In one example, a user can interact with a menu and select a menu item using a pointing device or touch screen. In another example, a user can interact with one or more application actions using voice commands. One skilled in the art can recognize that an indication of a user selecting an action may be provided either directly or indirectly to the application using a variety of means.

In step 240, the selection actions are performed. In various embodiments, the actions to be performed can be associated with designing a user interface. For example, a menu button "Add Fields" can contain a list of search fields as menu items to be added to a search form being designed by a user. Clicking on or otherwise selecting any of the menu items should add a search field on to the search form. In another example, a menu button "Add Column" can contain a list of column fields as menu items to be added to a report being designed by a user. Clicking on or otherwise selecting any of the menu items should add a new column on to the report. In yet another example, a menu button can contain a list of panels or portlets as menu items to be added to a page or portal being designed by a user. Clicking on or otherwise selecting any of the menu items should add a panel or portlet on to the page or to the portal. In a still further example, a menu button can contain a list of actions or modifiers as menu items to modifying existing data or a query being designed by a user. Clicking on or otherwise selecting any of the menu items should modify, update or otherwise change the existing data or query.

As discussed above, the menu items typically represent one or more repeatable actions. Each of the above fields, columns, panels, portlets, or data/query modifies can be invoked more than once. However, each subsequent invocation may have expected or unexpected consequences, and thus should not be specifically allowed or disallowed. In step 250, a visual representation of the selection actions is modified to indicate at least one performance of the action. FIG. 2 ends in step 260.

Figure 3:
FIG. 3 is a screenshot of a user interface display before information is communicated that one or more repeatable actions have been invoked at least once in one embodiment.

FIG. 3 is a screenshot of user interface display 300 before information is communicated that one or more repeatable actions have been invoked at least once in one embodiment. In this example, a menu button "Add Fields" contains a list of search fields as menu items to be added to a search form being designed by a user. Clicking on or otherwise selecting any of the menu items should add a search field on to the search form.

Figure 4:
FIG. 4 is a screenshot of a user interface display after information is communicated that one or more repeatable actions have been invoked at least once in one embodiment.

FIG. 4 is a screenshot of a user interface display 400 after information is communicated that one or more repeatable actions have been invoked at least once in one embodiment. In this example, a menu button "Add Fields" can contain a list of search fields as menu items to be added to a search form being designed by a user. Clicking on or otherwise selecting any of the menu items should add a search field on to the search form. User interface display 400 further includes a diamond icon next to the name of each search fields that has been added to the search form through the user interface. Icon 410 indicates that the "Manager" field has been added to the search form by the user selecting the field from the user interface.

In various embodiments, a visual representation that an action has been performed at least once may include common elements of visual language interfaces found in the WIMP ("window, icon, menu, pointer") paradigm. These elements are usually embodied in an interface using a widget toolkit and use visual conventions to represent the generic information shown.

In one aspect, a menu can be modified to indicate performance of the selected action. The menu bar may be displayed horizontally across the top of the screen, along the tops of some or all windows, or within or on other user interface elements. A pull-down menu is commonly associated with this menu type. When a user clicks on a menu option, the pull-down menu will appear. Items displayed in the pull down menu or areas nearby can be modified to indicate performance of an action associated with displayed menu items. In some embodiments, menu items can be represented by icons. An icon is a small picture that represents objects such as a file, program, web page, or command. In one aspect, the icon of a menu item may be modified (such as changed, animated, highlighted, etc.) in response to performance of the command. This is different from merely selecting the menu item or icon and temporarily highlighting the active focus of the user interface.

In further embodiments, repeatable actions can be visually represented by other controls or widgets). Some examples of controls or widgets are windows, text boxes, buttons, hyperlinks, drop-down lists, list boxes, combo boxes, check boxes, radio buttons, cycle buttons, datagrids, tabs, or the like. Each control or widget may have implicit or inherited attributes or features that can be modified to indicate visually that a repeatable action has been performed.

Figure 5:
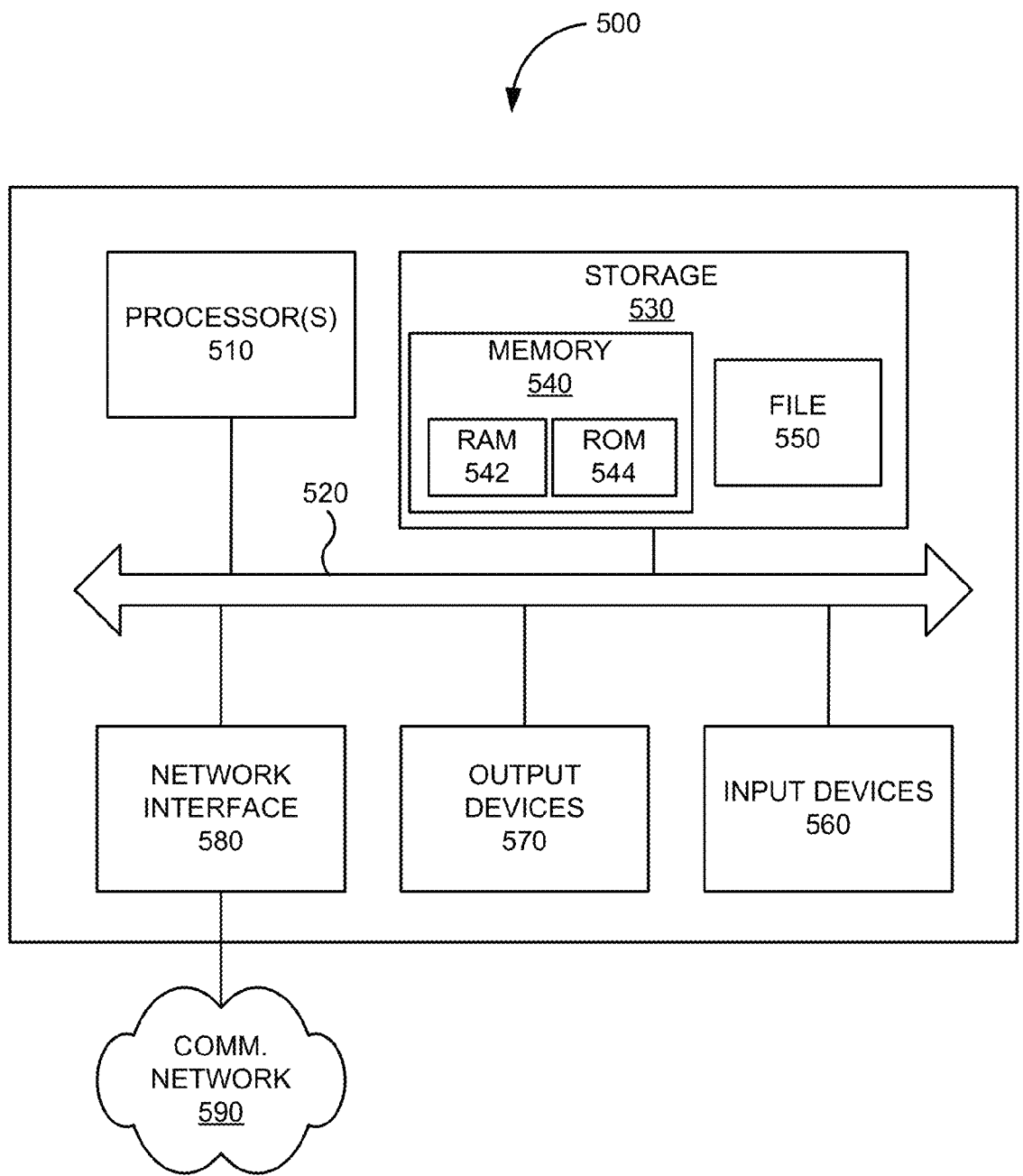
FIG. 5 is a simplified block diagram of a computer system that may be used to practice embodiments of the present invention

FIG. 5 is a simplified block diagram of computer system 500 that may be used to practice embodiments of the present invention. As shown in FIG. 5, computer system 500 includes processor 510 that communicates with a number of peripheral devices via bus subsystem 520. These peripheral devices may include storage subsystem 530, comprising memory subsystem 540 and file storage subsystem 550, input devices 560, output devices 570, and network interface subsystem 580.

Bus subsystem 520 provides a mechanism for letting the various components and subsystems of computer system 500 communicate with each other as intended. Although bus subsystem 520 is shown schematically as a single bus, alternative embodiments of the bus subsystem may utilize multiple busses.

Storage subsystem 530 may be configured to store the basic programming and data constructs that provide the functionality of the present invention. Software (code modules or instructions) that provides the functionality of the present invention may be stored in storage subsystem 530. These software modules or instructions may be executed by processor(s) 510. Storage subsystem 530 may also provide a repository for storing data used in accordance with the present invention. Storage subsystem 530 may comprise memory subsystem 540 and file/disk storage subsystem 550.

Memory subsystem 540 may include a number of memories including a main random access memory (RAM) 542 for storage of instructions and data during program execution and a read only memory (ROM) 544 in which fixed instructions are stored. File storage subsystem 550 provides persistent (non-volatile) storage for program and data files, and may include a hard disk drive, a floppy disk drive along with associated removable media, a Compact Disk Read Only Memory (CD-ROM) drive, a DVD, an optical drive, removable media cartridges, and other like storage media.

Input devices 560 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 500.

Output devices 570 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 500.

Network interface subsystem 580 provides an interface to other computer systems, devices, and networks, such as communications network 590. Network interface subsystem 580 serves as an interface for receiving data from and transmitting data to other systems from computer system 500. Some examples of communications network 590 are private networks, public networks, leased lines, the Internet, Ethernet networks, token ring networks, fiber optic networks, and the like.

Computer system 500 can be of various types including a personal computer, a portable computer, a workstation, a network computer, a mainframe, a kiosk, or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for communicating to users of applications that repeatable actions have been performed at least once, the method comprising:
   receiving, at one or more computer systems, information indicative of a user of an application causing a first action to be performed in response to the user selecting a visual representation of the first action from one or more visual representations of a plurality of actions that may be repeatable performed by the user of the application;
   receiving, at the one or more computer systems, information indicative of a determination that the first action has been performed; and
   modifying, with one or more processors associated with the one or more computer systems, the visual representation of the first action to indicate that the first action has been performed at least once.

2. The method of claim 1 wherein modifying, with the one or more processors associated with the one or more computer systems, the visual representation of the first action to indicate that the first action has been performed at least once comprises adding one or more visual elements to the visual representation of the first action.

3. The method of claim 1 wherein modifying, with the one or more processors associated with the one or more computer systems, the visual representation of the first action to indicate that the first action has been performed at least once comprises updating color of the visual representation of the first action.

4. The method of claim 1 further comprising:
   generating, with the one or more processors associated with the one or more computer systems, information configured to perform the first action.

5. The method of claim 4 wherein generating, with the one or more processors associated with the one or more computer systems, the information configured to perform the first action comprises generating information configured to add one or more search fields associated with the first action to a search user interface 6. The method of claim 4 wherein generating, with the one or more processors associated with the one or more computer systems, the information configured to perform the first action comprises generating information configured to add one or more columns associated with the first action to a table.

7. The method of claim 4 wherein generating, with the one or more processors associated with the one or more computer systems, the information configured to perform the first action comprises generating information configured to add one or more fields associated with the first action to a report.

8. The method of claim 4 wherein generating, with the one or more processors associated with the one or more computer systems, the information configured to perform the first action comprises generating information configured to add one or more panels or portlets associated with the first action to a portal.

9. The method of claim 4 wherein generating, with the one or more processors associated with the one or more computer systems, the information configured to perform the first action comprises generating information configured to modify one or more statements associated with the first action of a Structured Query Language (SQL) query.

10. A non-transitory computer-readable medium storing computer-executable code for communicating to users of applications that repeatable actions have been performed at least once, the non-transitory computer-readable medium comprising:
    code for receiving information indicative of a user of an application causing a first action to be performed in response to the user selecting a visual representation of the first action from one or more visual representations of a plurality of actions that may be repeatable performed by the user of the application;
    code for receiving information indicative of a determination that the first action has been performed; and
    code for modifying the visual representation of the first action to indicate that the first action has been performed at least once.

11. The non-transitory computer-readable medium of claim 10 wherein the code for modifying the visual representation of the first action to indicate that the first action has been performed at least once comprises code for adding one or more visual elements to the visual representation of the first action.

12. The non-transitory computer-readable medium of claim 10 wherein the code for modifying the visual representation of the first action to indicate that the first action has been performed at least once comprises code for updating color of the visual representation of the first action.

13. The non-transitory computer-readable medium of claim 10 further comprising:
    code for generating, with the one or more processors associated with the one or more computer systems, information configured to perform the first action.

14. The non-transitory computer-readable medium of claim 13 wherein the code for generating the information configured to perform the first action comprises code for generating information configured to add one or more search fields associated with the first action to a search user interface.

15. The non-transitory computer-readable medium of claim 13 wherein the code for generating the information configured to perform the first action comprises code for generating information configured to add one or more columns associated with the first action to a table.

16. The non-transitory computer-readable medium of claim 13 wherein the code for generating the information configured to perform the first action comprises code for generating information configured to add one or more fields associated with the first action to a report.

17. The non-transitory computer-readable medium of claim 13 wherein the code for generating the information configured to perform the first action comprises code for generating information configured to add one or more panels or portlets associated with the first action to a portal.

18. The non-transitory computer-readable medium of claim 13 wherein the code for generating the information configured to perform the first action comprises code for generating information configured to modify one or more statements associated with the first action of a Structured Query Language (SQL) query.

19. A non-transitory computer-readable media comprising computer-executable code for indicating presence of search fields displayed in menu of an application configured to generate search pages on a user-configurable search page designed by the application, the non-transitory computer readable medium comprising:
    code for generating a menu having a plurality of search fields that may be added to a search page designed by the application;

code for receiving information indicative of an action to add at least one search field selected from the menu to the search page;

code for generating information configured to perform the action to add the at least one search field to the search page; and code for updating the menu to include at least a visual indicator that the at least one search field has been added to the search page.

20. The non-transitory computer-readable medium of claim 19 wherein the code for updating the menu to include at least a visual indicator that the at least one search field has been added to the search page comprises code for adding one or more icons next to the at least one search field.

* * * * *

UNITED STATES PATENT AND TRADEMARK OFFICE
CERTIFICATE OF CORRECTION

PATENT NO. : 9,081,592 B2
APPLICATION NO. : 13/644134
DATED : July 14, 2015
INVENTOR(S) : Sriram Raghavan and Blake Sullivan Page 1 of 1

It is certified that error appears in the above-identified patent and that said Letters Patent is hereby corrected as shown below:

In the Specification

Column 2, lines 47/48: Replace "computer-readable media" with --computer-readable medium--

Column 3, line 54: Replace "WindowsTM" with --Windows™--

Column 3, line 55: Replace "MacintoshTM" with --Macintosh™--

Column 3, line 57: Replace "UNIXTM" with --UNIX™--

Column 4, line 19: Replace "Bluetooth TM" with --Bluetooth™--

In the Claims

Column 9, line 43: Replace "user interface" with --user interface.--

Column 10, line 59: Replace "computer-readable media" with --computer-readable medium--

Signed and Sealed this
Tenth Day of May, 2016

Michelle K. Lee
*Director of the United States Patent and Trademark Office*